United States Patent

Sanghera et al.

[11] Patent Number: 5,973,824
[45] Date of Patent: Oct. 26, 1999

[54] AMPLIFICATION BY MEANS OF DYSPROSIUM DOPED LOW PHONON ENERGY GLASS WAVEGUIDES

[75] Inventors: Jasbinder Sanghera, Greenbelt; Brandon Shaw, Laurel, both of Md.; Brian Cole, Alexandria, Va.; Barry Harbison, Dunkirk, Md.; Ishwar D. Aggarwal, Fairfax Station, Va.

[73] Assignee: The United States of America as represented by the Secretary of the Navy, Washington, D.C.

[21] Appl. No.: 08/920,877

[22] Filed: Aug. 29, 1997

[51] Int. Cl.⁶ .................................................. H01S 3/17
[52] U.S. Cl. ..................... 359/341; 359/134; 359/342; 372/6; 385/142
[58] Field of Search ..................... 359/134, 341, 359/342; 385/141, 142, 122; 372/6, 40; 501/78, 95, 900

[56] References Cited

U.S. PATENT DOCUMENTS 5,379,149  1/1995  Snitzer et al. ....................... 359/341

OTHER PUBLICATIONS

Wei et al, Optics Letters, vol. 19, #12, pp. 904–906; abstract only herewith, Jun. 15, 1994.

*Primary Examiner*—Nelson Moskowitz
*Attorney, Agent, or Firm*—Thomas E. McDonnell; George A. Kap

[57] ABSTRACT

Disclosed herein is an amplification method, an optical glass amplifier, a laser based on the amplifier and an amplification optical communication system, all based on a limited length of a single-mode glass fiber made from glass having phonon energy of less than about 350 $cm^{-1}$ and doped with dysprosium. The glass includes 0.1–30 mol % germanium, 0–40 mol % arsenic, 0.01–20 mol % X, 0.01–20 mol % Y, and 0.001–2 weight % dysprosium, wherein X is selected from the group consisting of gallium, indium and mixtures thereof selenium; and wherein Y is selected from the group consisting of selenium, and mixtures of selenium and up to 50% of sulfur. The system includes a coupler, a silica-based signal fiber carrying the optical signal that is to be amplified in communication with said coupling means, a pump light source in communication with the coupler, an amplifier in communication with the coupler at one end and another silica-based fiber joined to the amplifier at its other end. The method includes the steps of introducing the optical signal to be amplified into the coupler, introducing a pump optical signal into the coupling means, combining the optical signal and the pump optical signal, introducing the combined optical signal into the amplifier and amplifying the optical signal by exciting the electrons in dysprosium so they emit at about 1.3 $\mu$m.

13 Claims, 3 Drawing Sheets

AMPLIFICATION BY MEANS OF DYSPROSIUM DOPED LOW PHONON ENERGY GLASS WAVEGUIDES

REFERENCE TO RELATED APPLICATION

This application is related to application entitled "Low Phonon Energy Glass And Fiber Doped With A Rare Earth" which is being filed concurrently with this application on behalf of the same inventors and which is N.C.78,394; bears Ser. No.08/920,879; and was filed Aug. 29,1997.

BACKGROUND OF INVENTION

1. Field of Invention

This invention pertains to amplification of an optical signal with a waveguide made from glass having phonon energy of less than about 350 cm$^{-1}$ and doped with dysprosium.

2. Description of Prior Art

There is a need for 1.3 $\mu$m fiber optic amplifiers for telecommunications to enable high speed optical networking in local area networks for both military and commercial applications. Currently, a large proportion of the embedded plant is at 1.3 $\mu$m. Transoceanic submarine links utilize erbium doped fiber amplifiers based on silica fibers operating at 1.55 $\mu$m which corresponds to the wavelength of minimum loss in silica. However, the local area network applications require amplifiers at 1.3 $\mu$m for high bandwidth applications since this corresponds to the wavelength of zero dispersion in silica.

Currently, the telecommunication industry uses bulky electronic repeaters at 1.3 $\mu$m which convert the optical signal into an electronic signal which is amplified and then converted back into an optical signal via diode lasers. These repeaters are cumbersome, are detectable, and require high-cost maintenance. The telecom industry is actively involved in the development of compact fiber optic based amplifiers.

Silica fiber is not an appropriate host for 1.3 $\mu$m emission since the rare earth ions of praseodymium and dysprosium undergo multiphonon relaxation from their respective excited state, i. e., from $^1G_4$ to $^3F_3$ in praseodymium and from $^6H_{9/2}$, $^6F_{11/2}$ to $^6H_{11/2}$ in dysprosium. This effectively quenches the 1.3 $\mu$m emission rendering the device impractical. The phonon energy of silica is about 1100 cm$^{-1}$.

Much work has been performed in doping rare earth ions in lower phonon energy glasses such as fluoride glasses with phonon energies of greater than 500 cm$^{-1}$, and more recently, in sulfide glasses with phonon energies of greater than 400 cm$^{-1}$. The work in fluoride fibers has actually led to a commercial product, i. e., a praseodymium doped fiber amplifier operating at 1.3 $\mu$m. However, this product has not found widespread acceptance since the quantum efficiency is very low at less than 5%, signal gain is small at about 0.08 dB/mW, and the pump power requirements at 1.02 $\mu$m are extremely high at about 440 mW. The latter property leads to short diode lifetimes which inevitably adds to the cost and lack of reliability of the system. Furthermore, the chemical durability of fluoride glasses is poor compared to silica based fibers which have to meet long term reliability of greater than 15 years. All these characteristics contribute to the unfavorable response by the telecom industry to the use of praseodymium doped fluoride fiber amplifiers. While praseodymium does not work well in fluoride glasses, the 1.3 $\mu$m emission of dysprosium is even weaker in these glasses since it is multiphonon quenched.

On the other hand, sulfide glasses possess lower phonon energies than fluoride glasses and so consequently, have been doped with praseodymium. The glass compositions cited in the literature are based on Ga-La-S and Ge-Ga-S. The expected gain is proportional to the value of $\sigma_e\tau$ which represents the product of the measured emission cross-section ($\sigma_e$) and the lifetime of the excited state ($\tau$). The values of $\sigma_e\tau$ obtained for Ga-La-S, Ge-Ga-S and the fluoride glasses doped with praseodymium are 250, 479 and 39 ($\times 10^{-26}$ cm$^2$s), respectively. This indicates that the expected gain is about an order of magnitude higher than that obtained for praseodymium doped fluorides for the same pump power. In other words, the praseodymium doped sulfide glasses require about 10 times less pump power for the same gain. Quenching from the $^1G_4$ level in praseodymium still occurs to the $^3F_3$ level but to a lesser extent so that the quantum efficiency for the 1.3 $\mu$m emission is higher at about 30%. However, using the rate equation model for a 4-level system, it would appear that very low fiber losses are necessary in order to realize a practical amplifier device. For example, a loss of about 1 dB/m is required at around 1.3 $\mu$m to attain a gain of greater than 20 dB using a fiber length of over 10 meters containing 500 ppm of praseodymium. To date, the lowest loss reported in a multimode sulfide fiber over several meter lengths is only about 0.5 dB/m and occurs at longer wavelengths, typically at wavelengths greater than 2 $\mu$m. The loss at 1.3 $\mu$m is closer to 1 dB/m, at best. The problem is further highlighted by the fact that a single mode fiber of about 2 $\mu$m core diameter is needed for a fiber amplifier. The lowest loss reported to-date for a single mode sulfide fiber is greater than 1 dB/m, measured on a 1 meter length at long wavelengths exceeding 2 $\mu$m. Practical realization of a fiber amplifier at 1.3 $\mu$m requires 10–20 meter lengths of low loss praseodymium doped sulfide fiber which is difficult and cost intensive task to achieve.

Dysprosium has also been doped in sulfide glasses. For instance, excited state lifetime of only 38 $\mu$s for dysprosium in a Ge-Ga-S glass pumped at 810 has been measured. The emission was very weak. As$_2$S$_3$ glass doped with dysprosium did not show any fluorescence at 1.3 $\mu$m. More recently, Ge$_{30}$As$_{10}$S$_{60}$ and Ge$_{25}$Ga$_5$S$_{70}$ glasses doped with 0.2–0.5 weight percent dysprosium showed very weak fluorescence at 1.3 $\mu$m when pumping at about 808 nm. In another example, fluorescence was not observed in As$_2$S$_3$ glass containing 0.1 weight percent dysprosium although in As$_2$S$_3$ glass containing 1.7 mole percent iodine, in Ge$_{30}$As$_{10}$S$_{60}$ glass, in Ge$_{25}$Ga$_5$S$_{70}$ glass and in Ge$_{35}$S$_{56.5}$I$_{8.5}$ a weak fluorescence was observed at 1.3 $\mu$m with a measured lifetime of less than 38 $\mu$s, leading to a quantum efficiency of less than 20%. Ga-La-S glass has been doped with 500 ppm of dysprosium and fluorescence was observed at 1.3 $\mu$m with a measured lifetime of 59 $\mu$s, leading to a quantum efficiency of about 29%. This was achieved by pumping at 815 nm as well as 914 nm.

It appears that to date, the best rare earth ion dopant is praseodymium in a sulfide host for a potential fiber amplifier at 1.3 $\mu$m for telecommunications. However, the weak absorption cross-section for the $^1G_4$ level necessitates the use of longer fiber lengths and, therefore, low fiber losses are absolutely critical to enable this application.

Those skilled in the art have ruled out the use of lower phonon energy hosts or glasses such as selenide glasses, whose phonon energies are less than about 350 cm$^{-1}$, doped with praseodymium and dysprosium for potential 1.3 $\mu$m fiber optic amplifiers. This is because these ions are typically pumped at 1.02 $\mu$m and 0.815 $\mu$m (and 0.915 $\mu$m ), respectively. It is well known that the electronic edge, i.e., the short wavelength edge, is shifted to longer wavelengths in selenide glass hosts and so absorption by the electronic edge would be significant at the pump wavelengths used thus far, namely 1.02 μm in praseodymium and 0.815 μm or 0.914 μm in dysprosium. In addition, these small band gap materials exhibit a weak absorption tail which extends into the infrared. Consequently, it is widely believed that the emission at 1.3 μm would also be appreciably absorbed by the selenide host matrix, thereby making such amplifiers impractical.

In addition to the negative sentiments regarding the optical performance at 1.3 μm, it is widely believed that low phonon energy hosts, such as the selenide glasses (<350 cm$^{-1}$) possess poor solubility of rare earth ions which leads to clustering and crystallization, especially during fiber drawing. This has a detrimental effect on the fluorescence at 1.3 μm. Such clustering has been attributed to the lack of an appropriate site for the rare earth ions which arises from the difference in bonding character between the glass forming selenides and the rare earth precursors. In other words, the solubility of rare earths in low phonon energy selenide glasses is low since the glass structure consists of predominantly covalent bonding character while the rare earths prefer to form predominantly ionic bonds. Also, the refractory nature of rare earth selenides makes it harder for them to dissolve in the glass melt.

Optical waveguides come in different shapes and sizes, and examples include fibers and planar waveguides. Fibers are usually of circular cross-section and possess diameters of tens to hundreds of microns and lengths typically of a few meters to many kilometers. Planar waveguides typically possess thicknesses from a few microns to hundreds of microns and lengths from a few millimeters to several centimeters. The advantages of planar waveguides are that they are small and compact whereas fibers enable remote/long distance applications. Fiber waveguides are drawn from core/clad preforms or using crucible melting techniques whereas planar waveguides are made by depositing glass on a substrate and then using ion exchange or photochemistry to generate the core/clad waveguide structure.

OBJECTS AND SUMMARY OF INVENTION

An object of this invention is optical waveguides made from the dysprosium-doped low phonon energy glasses having less than 350 cm$^{-1}$ phonon energy used in telecommunication systems for amplification of signals and generation of laser power at 1.3 μm.

Another object of this invention is an amplification method and an optical waveguide made from a dysprosium-doped stable glass having phonon energy of less than about 350 cm$^{-1}$.

Another object of this invention is an optical fiber amplifier having a gain of at least 20 dB, which is equivalent to amplification of at least about 100 times.

Another object of this invention is an optical communication system based on the optical fiber amplifier made from glass having phonon energy of less than 350 cm$^{-1}$ and doped with dysprosium.

Another object of this invention is a laser based on a dysprosium-doped glass having phonon energy of less than about 350 cm$^{-1}$.

These and other objects of this invention can be attained by using a waveguide made from a glass having phonon energy of less than about 350 cm$^{-1}$ doped with dysprosium in connection with a pump light source which pumps light into the waveguide at an energy level of at least that of the optical amplification signal or for laser oscillation at about 1.3 μm.

DESCRIPTION OF PREFERRED EMBODIMENTS

Figure 1:
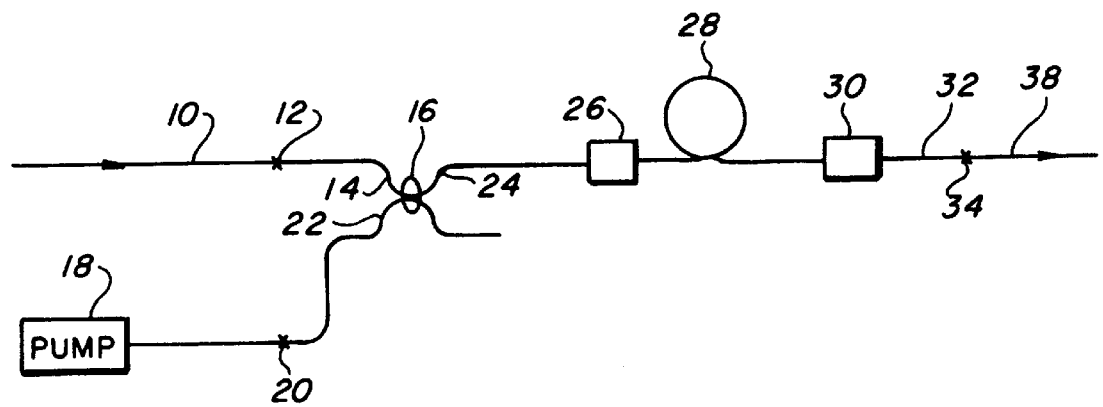
FIG. 1 is a schematic representation of a telecommunication system which incorporates a low phonon energy glass fiber waveguide amplifier doped with dysprosium.

This invention pertains to an optical glass waveguide amplifier which is based on a waveguide made from a glass having phonon energy of less than about 350 cm$^{-1}$ doped with dysprosium, to an optical communication system using the amplifier, to a laser based on the low phonon energy glass waveguide, and to an amplification method based on the dysprosium doped glass waveguide.

The optical waveguide, more specifically glass fiber, which forms the basis of the amplifier is made from a low phonon energy glass which is doped with dysprosium. The glass has a phonon energy of less than about 350 cm$^{-1}$ and comprises the following components given in mol percent except dysprosium, which is given in weight percent:

| component | general range | preferred range | especially preferred range |
|---|---|---|---|
| germanium (Ge) | 0.1–30 | 1–25 | 5–20 |
| arsenic (As) | 0–40 | 1–30 | 5–20 |
| gallium (Ga) | 0.01–20 | 0.1–10 | 0.2–5 |
| selenium (Se) | 40–85 | 50–75 | 55–75 |
| dysprosium (Dy) | 0.001–2 | 0.01–1.5 | 0.05–1 |

Sulfur can be substituted for selenium in amount of up to about 50%, preferably less than 30%. Indium can be substituted either partially or entirely for gallium. Other components can be added to the glass to improve optical, thermal and/or mechanical properties thereof. These other components include tellurium in an amount of up to 20% on mol basis, which is believed to modify refractive index; and a halogen or a mixture thereof, particularly iodine, in an amount of up to 20% on mol basis, which is believed to modify refractive index and increase rare earth solubility. Other additives when added to this glass in a small amount of up to 2 mol percent, can make some improvement. These other additives include thallium, cesium, antimony, tin, lead, cadmium, copper, silver, yttrium, scandium, lutitium, silicon, aluminum, phosphorus, tantalum, gadolinium, halides and mixtures thereof One suitable glass family is disclosed above. However, any other glass having phonon energy of less than about 350 cm$^{-1}$ is suitable herein.

The optical waveguides made from the glass noted above exhibit fluorescence as a result of dysprosium present therein.

The glass fiber waveguide of this invention can be made conventionally and it can be of any cross-sectional shape.

Typically, however, the fiber is circular in cross-section. For purposes herein, the fiber is 0.25–20 meters, preferably 0.5–5 meters in length and is about 20–500 microns, preferably 50–300 microns in diameter. The core is about 0.5–90%, with the remainder being the cladding. The fiber is preferably single mode at about 1 $\mu$m and its loss is less than 5 dB/m, preferably less than 2 dB/m. In order to keep most of the transmitted light within the core, the refractive index of the core must be greater than refractive index of the cladding.

The glass used to make the amplifier can be prepared by any appropriate method. For example, selenide glasses can be prepared by batching the glass components in a drybox. Highly purified components are used in order to enhance infrared transmission, especially the mid IR range. It is preferable to use components in elemental form rather than in the form of salts or compounds since the glass components in elemental form yield a more stable glass with a lower impurity level. All of the glass components can be purchased with the desired purity in excess of 99.9% purity on a metal basis. Selenium is available with a 99.999+% purity.

The batching step is carried out in a drybox by first weighing out the glass components. The weighing and batching steps are carried out in a drybox under an inert atmosphere with less than 1 ppm oxygen and water vapor to avoid oxidation and hydrolysis resulting in contamination of the components. Dysprosium can be added in elemental form, as a selenide, as a dysprosium chalcogenide, as a dysprosium halide or together with selenium to form dysprosium selenide. In the drybox, the glass components are weighed out, batched and then transferred to a quartz ampule.

After transferring the glass components into the quartz ampule, the ampule is taken from the drybox, evacuated, and sealed. After sealing, the ampule is heated to melt the contents and allow the contents to react at high temperatures to form the respective selenides. Typical melting schedules involve ramping the temperature from about room temperature to about 800 to 900° C. at a rate of about 1 to 10° C. per minute and then holding at about 800 to 900° C. for about 10 to 20 hours. After heating to about 800 to 900° C., the contents are in a liquid state and are allowed to mix further to achieve a more uniform distribution.

After the melting process, the molten glass is quickly quenched from about 600–900° C. to about $T_g$ or below in about 5 minutes in order to solidify the glass. Annealing of the glass is accomplished after solidification by extended heating of the glass at a temperature around $T_g$ in order to relieve stresses in the glass which may cause cracking/fracture of the glass blank. The glass is then characterized by powder x-ray diffraction and thermal analysis to confirm glass formation.

If the components are added in the form of selenide salts or compounds, it is not necessary to heat very slowly in order for the reaction of elemental selenium with the elemental metals to form the respective selenium compounds. Slow heating allows the selenium to fully react with the metal in a controlled manner. If current commercial grade selenide compounds are used, higher levels of oxide and hydroxide impurities are incorporated in the glass which will then reduce broadband infrared transmission because of absorption by the associated impurities in the residual precursors.

The glass fiber of this invention is made from a glass preform in a conventional manner. Drawing of the glass fiber is disclosed in the Sanghera et al patent application Ser. No. 08/672,771, filed Jun. 28, 1996, entitled "Method For Producing Core/Clad Optical Fiber Preforms Using Hot Isostatic Pressing," and bearing docket number NC 76,989. This application is incorporated herein by reference for its description of the apparatus and procedure for fabricating a glass fiber.

FIG. 1 is a schematic representation of an optical communication system containing the optical fiber amplifier. Referring to FIG. 1, the first signal light optical fiber 10 is routed to and fusion spliced at 12 with port 14 of a coupler, generally designated as 16. Signal fiber 10 carries the signal to be amplified and is normally a silica-based glass fiber. Light source 18, such as a laser is coupled into fiber 19 which, is fusion spliced at 20 with port 22 of coupler 16. On the other side of the coupler, i.e., after the signal light and the pump light are combined, port 24 is butt joined at 26 to one end of amplifier fiber 28 and the other end of amplifier fiber 28 is butt joined at 30 to a short-length numerical aperture matching optical fiber 32 which in turn is fusion spliced at 34 to the second signal optical glass fiber 38, which carries the amplified signal and is normally a silica-based fiber.

The purpose of coupler 16 is to combine pump light with signal light and deliver it to amplifier fiber 28 where the light or the optical signal is amplified before it enters the signal light optical fiber 38. Other coupling means can be used to couple signal light and pump light. An example of another coupling means includes a notch in the first signal fiber carrying the signal light to be amplified. The pump light is introduced into the signal light fiber by shining the pump light into the notch which has the effect of combining the signal light and the pump light in the first signal light fiber.

To illustrate the function of a coupler, assume a 1.31 $\mu$m optical signal at energy of 5 $\mu$W in optical fiber 10 and a pump light in fiber 19 at wavelength of 1.29 $\mu$m at energy of 50 $\mu$mW. As the signal light and the pump light propagate through the coupler, the signal light and the pump light are fed to port 24 which winds up with the 1.31 $\mu$m signal light and the pump light at 1.29 $\mu$m. After passing through amplifier fiber 28, the light or optical signal issuing from the amplifier fiber 28 is 1.31 $\mu$m light at amplified energy of about 5 $\mu$mW or about 1000 times corresponding to 30 dB gain. Energy of the pump light is absorbed during the amplification process.

Figure 2:
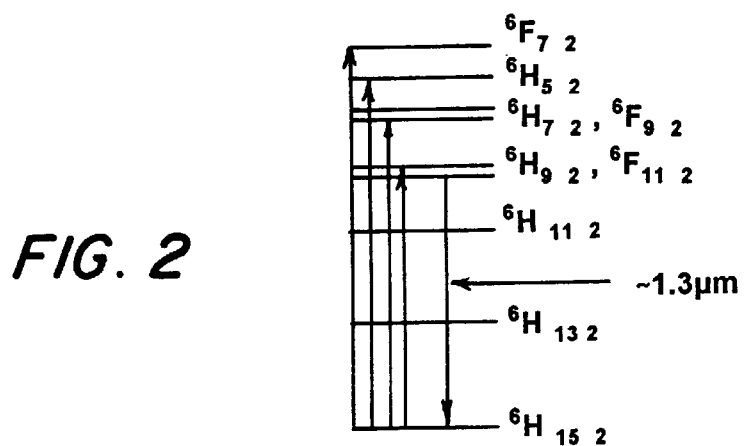
FIG. 2 is an energy level diagram for dysprosium for the lower energy levels thereof.
Figure 4:
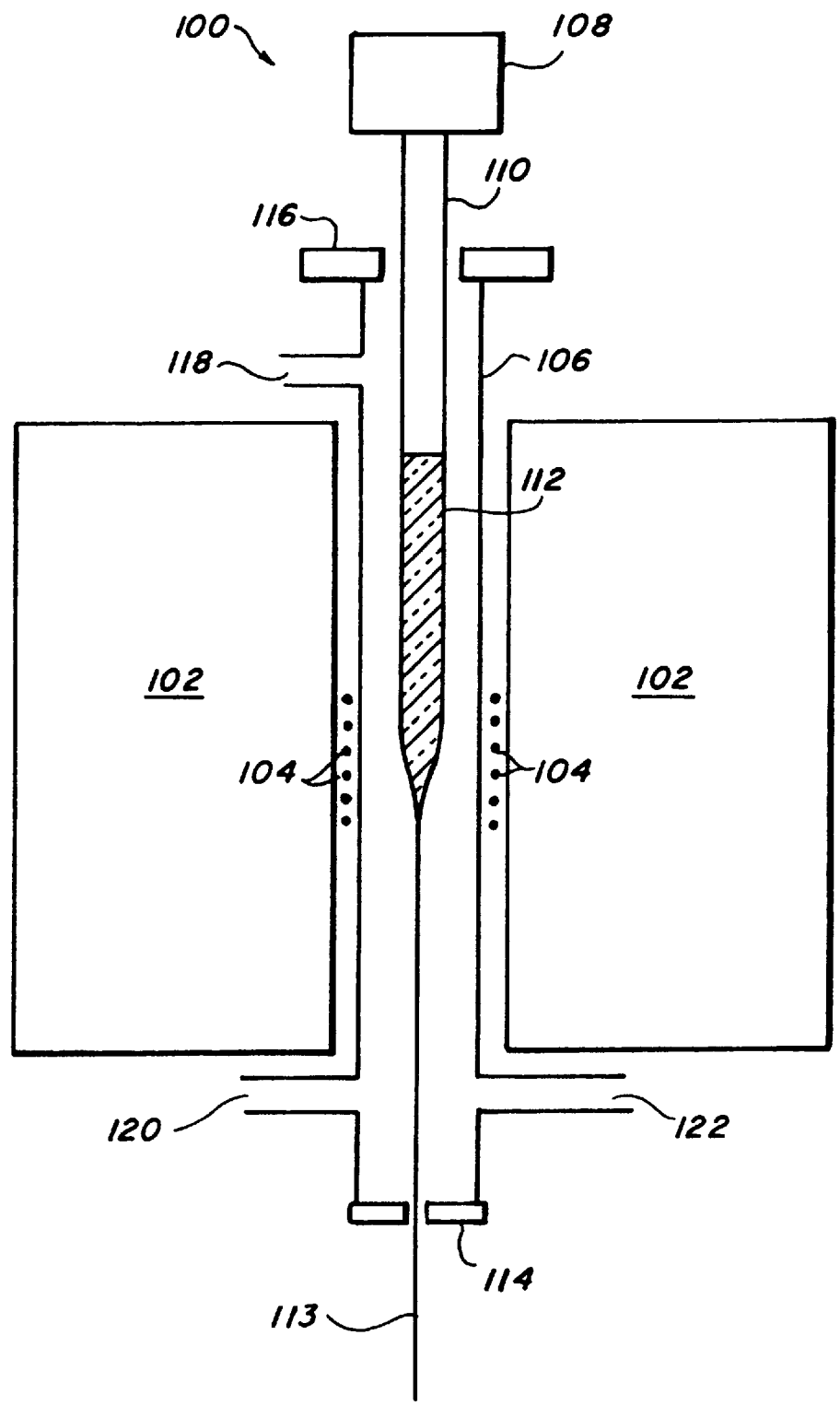
FIG. 4 is a schematic representation of the apparatus used to make the optical fiber of this invention.

Amplification of the signal light in the amplifier fiber 28 is explained by reference to FIG. 2, which is a dysprosium energy level diagram for the lower lying energy levels thereof. When the pump light enters amplifier fiber 28, it excites dysprosium electrons from the ground energy level $^6H_{15/2}$ to the $^6H_{9/2}, ^6F_{11/2}$ energy levels. The signal light then stimulates the excited electrons in the $^6H_{9/2}, ^6F_{11/2}$ energy level to return to the ground level $^6H_{15/2}$, and while returning to the lower energy band, the ions emit radiation which results in amplification of the signal light.

The optical amplification disclosed herein includes pumping to the $^6H_{9/2}, ^6F_{11/2}$ energy level and pumping from other energy levels at which electrons decay to the lower $^6H_{9/2}, ^6F_{11/2}$ energy level from which emission takes place at 1.3 $\mu$m. A specific example of this is the energy level $^6H_{7/2}, ^6F_{9/2}$ into which light at 1.1 $\mu$m can be pumped resulting in a non-radiative decay of the electrons to the lower $^6H_{9/2}, ^6F_{11/2}$ energy level from where radiative emission takes place down to the ground level $^6H_{15/2}$.

In addition to amplifying an optical signal at 1.3 $\mu$m, a multi wavelength or a dual wavelength amplifier can be made by doping the low phonon glass, from which the amplifier fiber is made, not only with dysprosium but also with erbium and/or praseodymium. Amounts of the erbium and/or praseodymium are in the ranges given for dysprosium. Since erbium and praseodymium have emissions at 1.5 µm, amplifier fiber made from the low phonon energy glass doped with dysprosium and one or both erbium and praseodymium, could be used to amplify light at 1.3 µm and at 1.5 µm.

The low phonon energy glass fiber disclosed herein can prevent bottlenecking and excited state absorption by incorporating therein amounts of up to about 10, preferably 0.01–2 weight percent terbium and europium. Additives such as ytterbium, erbium, and neodymium can also added to the glass in amount of up to about 2 weight percent for energy transfer at about 1.1 µm and 1.3 µm. The weight percentages are based on the weight of the glass components which are given herein in mol percent.

Figure 3:
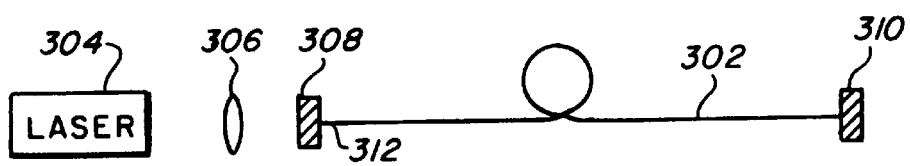
FIG. 3 is a schematic representation of a laser which incorporates a low phonon energy glass waveguide doped with dysprosium.

Schematic illustration of a laser is shown in FIG. 3 which consist of a resonant cavity at a wavelength of the $^6H_{9/2}$, $^6F_{11/2} \rightarrow {}^6H_{15/2}$ transition and the dysprosium doped fiber (active medium). The dysprosium doped fiber within the resonant cavity is in the form of fiber 302 and is made from a glass having phonon energy of less than about 350 cm$^{-1}$ doped with dysprosium, pump means, in the form of a laser 304 for providing optical pump power to the dysprosium doped fiber to raise dysprosium ions therein directly to the $^6H_{9/2}$, $^6F_{11/2}$ levels, and reflection means, in the form of a pair of input and output dielectric mirrors 308, 310 having high reflectivity, preferably greater than 90%. Lens 306 directs the optical signal from laser 304 into the dysprosium doped fiber 302. Reference numeral 308 represents an index matching material.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

This example demonstrates preparation of $Ge_{16.5}As_{18.8}Ga_{0.2}Se_{64.5}$ glass of this invention doped with 200 ppm of praseodymium.

A silica glass ampule with a wall thickness of 3 mm was first etched with dilute hydrofluoric acid, washed with deionized water and dried in an oven at about 110° C. The dried ampule was then brought into a drybox containing less than 1 parts per million (ppm) water and oxygen. In the drybox, individual elements were weighed to provide the following glass composition: $Ge_{16.5}As_{18.8}Ga_{0.2}Se_{64.5}$. The purity of the elements based upon weight percent were Ga-99.99999%, Ge-99.9999%, As-99.9995% and Se-99.995%. The selenium and arsenic were further purified by distilling them to remove water, oxides and carbon. The total weight of the batch was 10 grams with an additional 200 ppm praseodymium metal which was used to dope the glass.

The batch was mixed and loaded into the ampule. Using the vacuum valve assembly, the ampule was sealed, removed from the drybox and hooked up to the vacuum system which consisted of a turbomolecular pump and a mechanical pump. The assembly was evacuated for about one hour and then the silica ampule was sealed off with an oxygen-methane torch. The sealed ampule was then placed into a furnace and the glass components were melted. The melting schedule was as follows: 10° C./min to 500° C., dwell at 500° C. for 3 hours; ramp at 5° C./min to 900° C., dwell for 14 hours; ramp at 10° C./min to 750° C., dwell for 2 hours. A rocking furnace was used to ensure adequate mixing of the batch components. The rocking was suspended during the 750° C. dwell for fining of the glass. The ampule was removed from the furnace at 750° C. and quenched in water. The glass was subsequently annealed at 210° C. for approximately 3 hours, slowly cooled to room temperature and removed from the ampule for characterization and fiberization.

Other glasses of this invention were prepared as described in Ex. 1 and their compositions, and composition of the glass of Ex. 1, are given in Table A, below, with some additional information:

TABLE A

Glasses of This Invention

| Composition | Dopant | Dopant (ppm) | $T_g$ (° C.) | $T_{draw}$ (° C.) | Fiber Loss (dB/m) |
|---|---|---|---|---|---|
| 1. $Ge_{16.5}As_{18.8}Ga_{0.2}Se_{64.5}$ | Pr | 200 | 237 | 387 | 0.7 @ 6.61 µm |
| 2. $Ge_{16.5}As_{18.3}Ga_{0.7}Se_{64.5}$ | Pr | 2000 | 237 | 370 | 1.8 @ 6.07 µm |
| 3. $Ge_{12.5}As_{18.8}Ga_{0.2}Se_{58.5}S_{10}$ | Dy | 200 | 167 | 352 | 2.6 @ 6.05 µm |
| 4. $Ge_{16.5}As_{18.8}Ga_{0.2}Se_{64.5}$ | Dy | 750 | 237 | 385 | 1.2 @ 6.19 µm |

EXAMPLE 2

This example demonstrates drawing a glass fiber from the glass identified herein. The apparatus used to draw the fiber is shown in FIG. 1.

A glass preform of the composition $Ge_{16.5}As_{18.8}Ga_{0.2}Se_{64.5}$ doped with about 200 ppm praseodymium was melted in accordance with Ex. 1. Approximately 1000 ppm of tellurium chloride (TeCl$_4$) was also doped into the glass to reduce the mid-IR H-Se absorption band, as disclosed in the Sanghera et al patent application entitled "Process For Removing Hydrogen And Carbon Impurities From Glasses," filed Jun. 26, 1996, bearing Ser. No. of 08/670,910 and docket number of NC 77,216. The preform had a nominal diameter of 6 mm with a length of about 5 cm. The core only fiber was drawn via the apparatus disclosed in patent application bearing the docket number of NC 76,989. The glass fiber was drawn at a temperature of 387° C. at about 2m/min. A total of 11 meters of the fiber with outside diameter of about 200 µm was drawn. The minimal loss for a section of the fiber drawn from this preform measured approximately 0.7 dB/m at $^{6.61}$ µm.

EXAMPLE 3

This example demonstrates optical fluorescence at 1.3 µm by the fiber made from the glass composition #3 given in Table A, above. The glass was made in a similar manner to that of Ex. 1, above. The fiber was drawn at 352° C. in a similar manner to that of Ex. 2, above.

Figure 5:
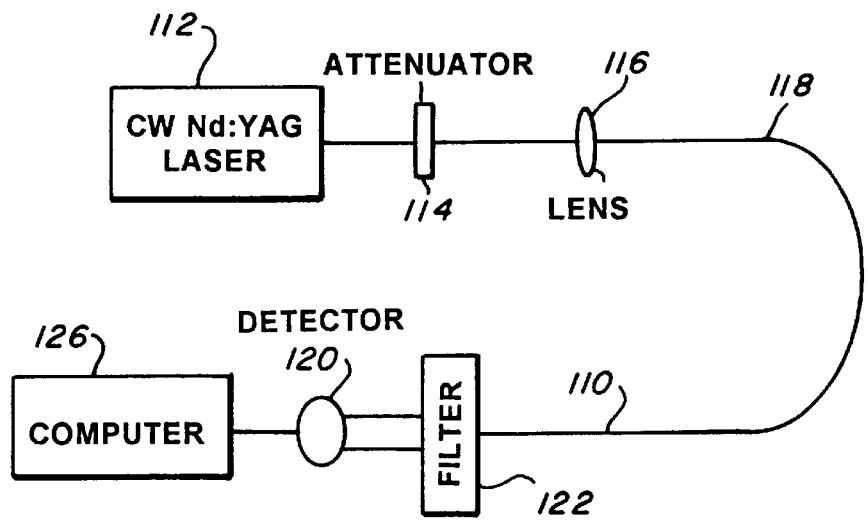
FIG. 5 is the experimental set-up used in Ex. 4.

Referring to FIG. 5, room temperature lifetimes for the $^6H_{9/2}$, $^6F_{11/2}$ energy level were measured by pumping chalcogenide glass fiber $Ge_{12.5}As_{18.8}Ga_{0.2}Se_{58.5}S_{10}$ doped with 200 ppm dysprosium with a pulsed Nd:YAG laser 112 operating at 1.064 µm through attenuator 114, lens 116 and SiO$_2$-based fiber 118. The laser 112 produced 10 mJ, 10 ns pulses which were fiber coupled to the entrance end of the dysprosium doped fiber 110. Emission was detected by InSb detector 120 with appropriate 1.3 μm bandpass filter 122 in place to select the desired 1.3 μm emission band and to block 1.064 μm light. The signal from the detector was fed into computer 126 for signal averaging. The computer controlled the data acquisition.

Function of attenuator 114 was to reduce power of laser 112 to 10 mJ and function of lens 116 was to focus light into fiber 118.

Fiber 118 had core of 50 μm and clad O.D. of 200 μm and extended from laser 112 to the doped amplifier fiber 110 where it was butt joined thereto. Fiber 110 was core only fiber 2 cms outside diameter of 250 μm and a loss of 2.6 dB/m at 6.05 μm and a loss of 8 dB/m at about 1.3 μm.

The measured lifetime for the $^6H_{9/2}$, $^6F_{11/2}$ energy level, which represents the upper level for the 1.3 μm emission from $^6H_{9/2}$, $^6F_{11/2}$ to $^6H_{15/2}$, was greater than 300 μs and the measured emission cross-section was about $2.8 \times 10^{-20}$ cm². This gives a value of over $840 \times 10^{-26}$ cm²s for the product $\sigma_e \tau$, which is proportional to the gain. This is almost double the value observed for praseodymium doped sulfide glass and about more than 20 times the value for praseodymium doped fluoride glass.

Pumping of the $^6H_{9/2}$ level in dysprosium at 1.28 μm corresponded to an absorption cross-section which is about 10 times larger than the $^1G_4$ of praseodymium in a sulfide glass. Other advantages over praseodymium in a sulfide glass include the emission cross-section which is 1.6 times larger and the bandwidth which is about 1.5 times larger. All these advantages reveal that a dysprosium doped low phonon energy glass fiber can possess a loss significantly greater than 1 dB/m and still give about 20 dB gain.

EXAMPLE 4

This example demonstrates fluorescence of a glass fiber doped with dysprosium made from glass having phonon energy of less than about 350 cm$^{-1}$.

Chalcogenide fiber made from a glass having phonon energy of less than about 350 cm$^{-1}$ with a composition of $Ge_{16.5}As_{18.8}Ga_{0.2}Se_{64.5}$, i. e., composition #4 in Table A, above, and containing 750 ppm dysprosium ($Dy^{+3}$) was used for measuring fluorescence at 1.3 μm. The minimum loss of a 1-meter long, 300 μm outside diameter fiber was less than 1.2 dB/m at about $^6$ μm and the loss at about 1.3 μm was about 2.5 dB/m.

Figure 6:
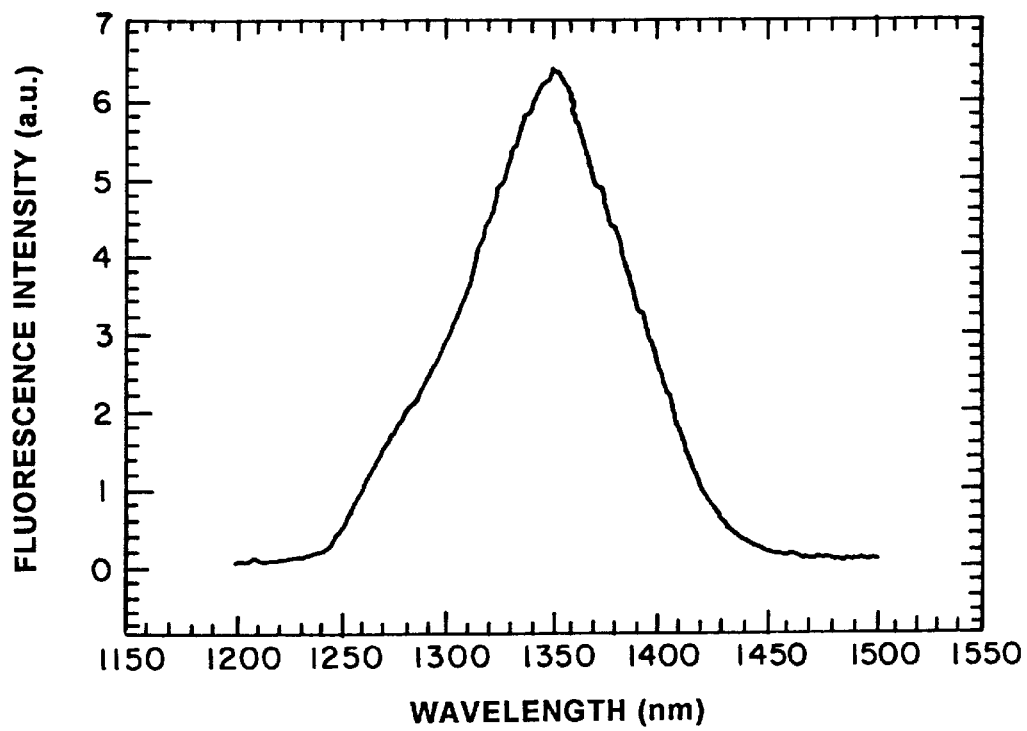
FIG. 6 is a plot of fluorescence versus wavelength for a 2 cm long fiber made from glass having phonon energy of less than about 350 cm$^{-1}$ and doped with dysprosium.

The experimental set up is shown in FIG. 5 but including a chopper and a monochrometer in place of filter 122, which is described in Ex. 3, above. The fiber 110 was excited with chopped radiation from the CW Nd:YAG laser 112 at 1.064 μm. Emission from the fiber was coupled into the entrance slit of filter 122. The fluorescence at the output end of the monochrometer was detected with an InSb detector 120. The signal from the detector was fed into computer 126 for signal averaging of the chopped signal. The computer controlled scanning of the monochrometer and carried out the data acquisition. Room temperature fluorescence spectra was observed at the excitation wavelength for the $^6H_{9/2}$, $^6F_{11/2} \rightarrow {}^6H_{15/2}$ transition which corresponds to 1.3 μm in the dysprosium doped chalcogenide fiber. An example of the measured spectrum from the dysprosium doped low phonon energy glass fiber is shown in FIG. 6.

Fluorescence observed by pumping at about 1.1 μm was also remarkable since the 1.064 μm excitation wavelength is on the short wavelength edge of the 1.1 μm absorption band in dysprosium.

While presently preferred embodiments have been shown of the invention disclosed herein, and of the several modifications discussed, persons skilled in this art will readily appreciate that various additional changes and modifications can be made without departing from the spirit of the invention as defined and differentiated by the following claims.

What we claim is:

1. An amplifier comprising a glass waveguide made from a glass having phonon energy of less than about 350 cm$^{-1}$ doped with dysprosium and a pump light for providing optical pump power to said waveguide to raise dysprosium ions to at least the $^6H_{9/2}$, $^6F_{11/2}$ levels resulting in about 1.3 μm emission when decaying to the $^6H_{15/2}$ level.

2. The amplifier of claim 1 wherein said amplifier is in fiber form, the fiber is single mode, is 0.25–20 m in length, has diameter of 20–500 μm, has loss of less than about 5 dB/m, and the glass from which it is made comprises the following components given in mol percent:

| | |
|---|---|
| germanium | 0.1–30 |
| arsenic | 0–40 |
| X | 0.01–20 |
| Y | 40–85 | wherein X is selected from the group consisting of gallium, indium and mixtures of gallium and indium; wherein Y is selected from the group consisting of selenium and mixtures of selenium and up to 50% sulfur substituted for selenium; the glass also containing 0.001–2 weight percent of dysprosium, based on the weight of said components.

3. The amplifier of claim 2 including up to 10 weight percent of a first additive selected from the group consisting of terbium, europium, and mixtures thereof, and up to 2 weight percent of a second additive selected from the group consisting of neodymium, erbium, ytterbium, and mixtures thereof; and up to 2 mol percent of a third additive selected from the group consisting of thallium, cesium, antimony, tin, lead, cadmium, copper, silver, yttrium, scandium, lutitium, silicon, aluminum, phosphorus, tantalum, gadolinium, halides and mixtures thereof.

4. The amplifier of claim 3 wherein amount of germanium is 1–25, amount of arsenic is 1–30, amount of X is 0.1–10, amount of Y is 50–75 and amount of dysprosium is 0.01–1.5.

5. The amplifier of claim 3 wherein amount of germanium is 5–20, amount of arsenic is 5–20, amount of X is 0.2–5, amount of Y is 55–75 and amount of rare earth is 0.05–1.

6. A method of amplifying an optical signal comprising the steps of:

introducing the signal to be amplified into a coupling means, introducing a pump light at a higher energy than the signal into the coupling means, combining the signal and the pump light in the coupling means, introducing the combined signal and light into an amplifier waveguide made from glass having phonon energy of less than about 350 cm$^{-1}$ and doped with dysprosium where the optical signal is amplified.

7. The method of claim 6 wherein the waveguide is a single mode fiber 0.25–20 m in length, has diameter of 20–500 μm, and has loss of less than about 5 dB/m, the glass from which the amplifier fiber is made comprises the following components given in mol percent:

| | |
|---|---|
| germanium | 0.1–30 |
| arsenic | 0–40 |
| X | 0.01–20 |
| Y | 40–85 | wherein X is selected from the group consisting of gallium, indium and mixtures of gallium and indium; wherein Y is selected from the group consisting of selenium and mixtures of selenium and up to 50% sulfur substituted for selenium; and wherein the glass also contains 0.001–2 weight percent of dysprosium, based on the weight of said components.

8. The method of claim 7 wherein said amplifier includes up to 10 weight percent of a first additive selected from the group consisting of terbium, europium, and mixtures thereof; and up to 2 weight percent of a second additive selected from the group consisting of neodymium, erbium, ytterbium, and mixtures thereof.

9. The method of claim 8 wherein amount of germanium is 1–25, amount of arsenic is 1–30, amount of X is 0.1–10, amount of Y is 50–75 and amount of dysprosium is 0.01–1.5.

10. The method of claim 8 wherein amount of germanium is 5–20, amount of arsenic is 5–20, amount of X is 0.2–5, amount of Y is 55–75 and amount of dysprosium is 0.05–1.

11. The method of claim 9 wherein said glass has phonon energy of about $350^{-1}$ cm and loss of less than about 5 dB/m.

12. The method of claim 8 including the step of pumping the pump light at an energy about equal to or greater than that of the optical signal to be amplified.

13. The method of claim 8 wherein the optical signal to be amplified is at a wavelength of about 1.3 $\mu$m and length of the amplifier fiber is 2–5 meters.

* * * * *